June 11, 1929.  J. F. O'CONNOR  1,716,865
FRICTION SHOCK ABSORBING MECHANISM
Original Filed Feb. 8, 1923
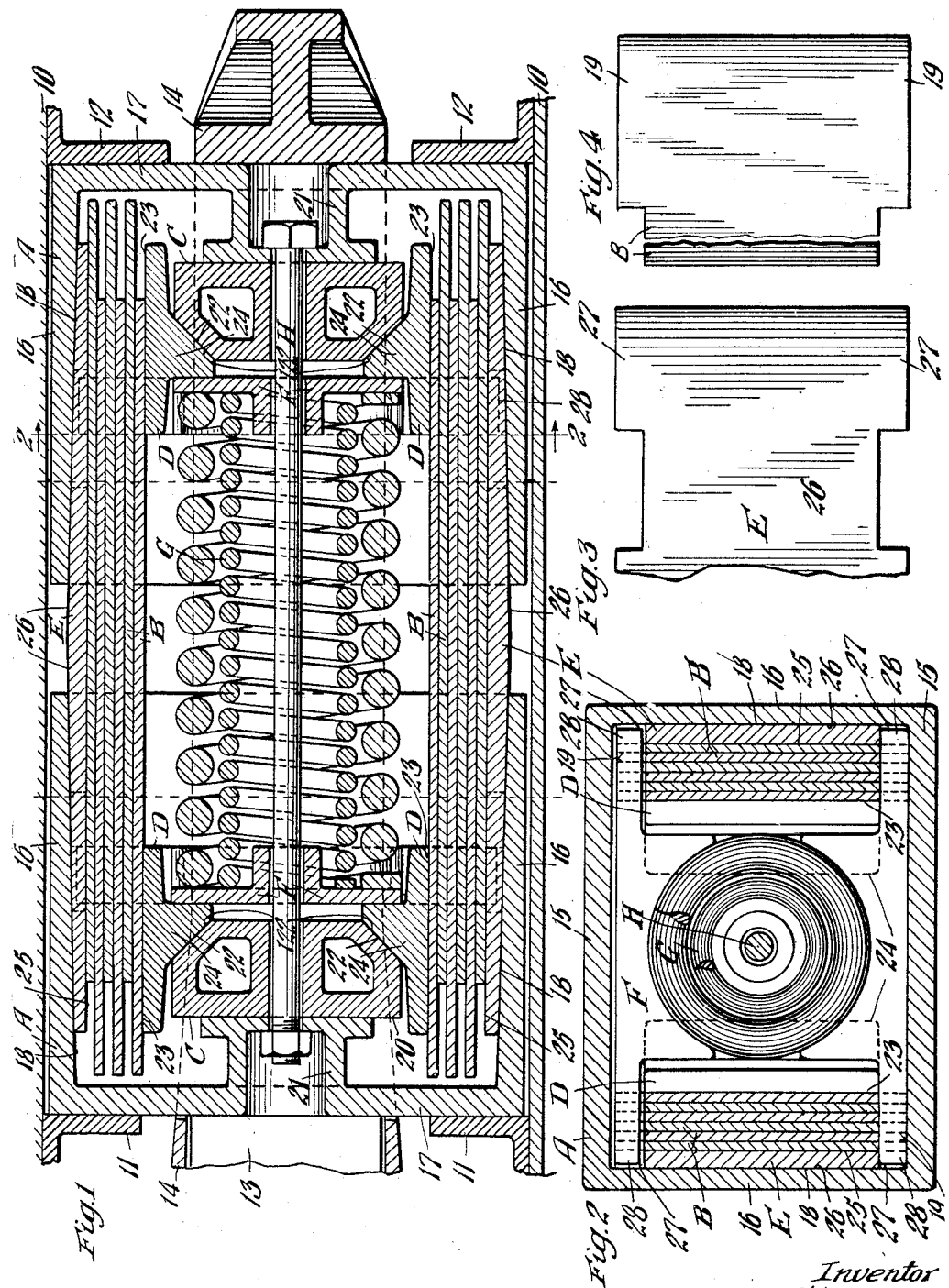
Witness
Wm. Geiger
Inventor
John F. O'Connor
By George D. Haight
His Atty.

Patented June 11, 1929.

1,716,865

UNITED STATES PATENT OFFICE.

JOHN F. O'CONNOR, OF CHICAGO, ILLINOIS, ASSIGNOR TO W. H. MINER, INC., OF CHICAGO, ILLINOIS, A CORPORATION OF DELAWARE.

FRICTION SHOCK-ABSORBING MECHANISM.

Original application filed February 8, 1923, Serial No. 617,695. Divided and this application filed January 31, 1927. Serial No. 164,836. Renewed November 19, 1928.

This invention relates to improvements in friction shock-absorbing mechanisms.

This application is a division of my application Serial No. 617,695 for friction shock absorbing mechanisms, filed February 8, 1923.

One object of the invention is to provide a friction shock absorbing mechanism, more particularly adapted for railway draft riggings, wherein is obtained high capacity due to relatively large frictional areas in combination with a differential wedge action.

Another object of the invention is to provide a mechanism of the character indicated, including duplicate front and rear combined follower and friction shells, a plurality of relatively movable friction plates arranged in two groups at opposite sides of the mechanism, wedge spreading means interposed between the two groups of plates at opposite ends of the mechanism, each spreading means including a wedge block and a pair of co-operating friction shoes engaging the plates, and a tapered friction element interposed between each group of plates and the corresponding friction surfaces of the front and rear shells.

Other objects and advantages of the invention will more fully and clearly appear from the description and claims hereinafter following.

In the drawing, forming a part of this specification, Figure 1 is a horizontal longitudinal sectional view of a portion of a railway draft rigging, showing my improvements in connection therewith. Figure 2 is a vertical transverse sectional view corresponding substantially to the line 2—2 of Figure 1. Figure 3 is a broken elevational view of a tapered friction element employed in connection with my improved shock absorbing mechanism; and Figure 4 is a side elevational view, partly broken away, of one of the friction plates of said mechanism.

In said drawings, 10—10 indicate channel-shaped center or draft sills of a railway car underframe, to the inner faces of which are secured front stop lugs 11—11 and rear stop lugs 12—12. The rear end portion of the drawbar is designated by 13, to which is connected a hooded yoke 14. The shock absorbing mechanism proper is disposed within the yoke, and the yoke and the parts therewithin are supported by the usual saddle plate.

My improved mechanism comprises broadly: Front and rear follower casings A—A; two groups of friction plates B—B; front and rear wedge blocks C—C; two pairs of friction shoes D—D; a pair of tapered friction elements E—E; front and rear spring followers F—F; a main spring resistance G; and a retainer bolt H.

The front and rear follower casings A are of similar construction, each being in the form of a substantially box-like casting having horizontally disposed spaced top and bottom walls 15—15, longitudinally extending spaced side walls 16—16 and an outer transverse end wall 17. The end wall 17 of each casing A co-operates with the corresponding stop lugs on the draft sills in the manner of the usual follower. The side walls 16 of each casing are provided with longitudinally extending interior friction surfaces 18—18. The friction surfaces 18 are inclined with respect to the longitudinal axis of the mechanism and converge toward the end wall of the casing. When the mechanism is in the full release position shown in Figure 1, the inner end of the front and rear casings A are spaced apart to such an extent that when the mechanism is fully compressed, the casings will abut, thereby acting as solid column load transmitting members to prevent undue compression of the main spring resistance G.

The friction plates B are arranged in two groups at opposite sides of the mechanism, each group preferably comprising six plates. The plates B are all of similar design, each being enlarged at one end thereof to provide top and bottom lugs 19—19 adapted to co-operate with the spring followers F as hereinafter pointed out to effect restoration of the plates to normal position after each compression of the mechanism. The six plates of each group are so arranged that alternate plates have the ends bearing the lugs disposed at the same end of the mechanism. It will be evident that the plates of each group are thus positioned, when restored by the spring followers so that the ends of the plates at the front and rear of the mechanism will be staggered. In the normal position of the parts, three alternate plates of each group have their front ends spaced from the end wall of the front casing A and the remaining three plates have their rear ends spaced from the end wall of the rear follower A. By this arrangement, it will be evident that upon relative approach of the followers, during the initial action of the mechanism, there will be no relative movement of the plates, thereby providing light frictional resistance. When the follower casings A have been moved relatively toward each other, a predetermined distance, the outer ends of the plates will be engaged and the plates of each group will be compelled to move relatively to each other.

The wedge blocks C which are disposed at the front and rear ends of the mechanism are of identical design. Each of the wedge blocks C has a flat end face 20 adapted to bear on an inwardly projecting hollow boss 21 disposed on the end wall 17 of the corresponding follower casing A. Each wedge block C is also provided with a pair of wedge faces at opposite sides thereof adapted to co-operate with the friction shoes D at the same end of the mechanism. The friction shoes D are arranged in two pairs at the front and rear of the mechanism and co-operate with the wedges C. Each friction shoe is provided with an outer longitudinally disposed flat friction surface 23 adapted to co-operate with the innermost friction plate B at the same side of the mechanism. On the inner side, each friction shoe D is provided with a lateral enlargement 24 having a wedge face 122 thereon correspondingly inclined to and adapted to co-operate with the wedge face 22 of the wedge block C.

The friction elements E are two in number and are disposed at opposite sides of the mechanism between the friction plates and the corresponding side walls of the casing A. Each of the friction elements E is in the form of an elongated rectangular plate having an inner longitudinally disposed flat friction surface 25 adapted to engage the outermost plate of the group B at the corresponding side of the mechanism. On the outer side, each friction plate is provided with a pair of inclined friction surfaces 26—26 disposed at opposite ends of the plate and co-operating respectively with the friction surfaces 18 of the front and rear casings A. At the opposite ends, each plate E is enlarged to provide top and bottom lugs 27—27 adapted to co-operate with the front and rear spring followers F to effect centering of the friction elements after each compression stroke of the mechanism.

The spring resistance G comprises an inner light coil and an outer heavier coil having their opposite ends bearing on the spring followers F which are interposed between the spring resistance and the enlargements 24 on the friction shoes D at the opposite ends of the mechanism.

The spring followers F are in the form of plate-like members having a pair of laterally projecting arms 28—28 at opposite sides thereof, the arms 28 of each pair being vertically spaced so as to accommodate the main body portion of the friction plates B and the friction elements E therebetween. The arms 28 co-operate with the lugs 19 of the friction plates to effect restoration of the latter to normal position and also co-operate with the lugs 27 at the opposite ends of the friction elements E to restore the same to normal position also, in case they are displaced from their centered position during compression of the mechanism. The mechanism is held under initial compression by the retainer bolt H extending through aligned openings in the spring followers F and the wedge member C, and having its opposite ends anchored to the front and rear follower casings, the head of the bolt being accommodated in the hollow boss 21 of the rear follower casing A and the nut of the bolt being disposed within the hollow boss 21 of the front follower casing. The retainer bolt not only serves to maintain the parts assembled, but also maintains the same of overall uniform length and serves to hold the springs under a predetermined initial compression.

The operation of my improved shock absorbing mechanism, assuming a compression stroke, is as follows: The follower casings A will be moved relatively toward each other, thereby carrying the wedge blocks C inwardly toward each other and setting up a wedging action between the same and the friction shoes D at the opposite ends of the mechanism. The friction shoes D are thus forced apart, placing the friction plates of the two groups B under lateral compressions, forcing the same against the friction elements E which are held against outward movement by the side walls of the casings A. During the initial operation of the mechanism, there will be substantially no relative movement of the friction plates due to the clearance existing between the outer ends of the plates and the end walls of the casing A. When the clearance between the outer ends of the plates and the end walls of the casings has been taken up, the plates of each group will be forced to move relatively to each other in unison with the follower casings A during the remainder of the compression stroke of the mechanism, thereby greatly augmenting the resistance offered. During the relative approach of the front and rear follower casings A, there will also be a lateral inward movement of the friction elements E toward each other, due to the inclination of the co-operating friction surfaces of the follower casings and the friction elements. A differential action will thus be effected, causing the wedge friction shoes to slip inwardly on the wedge faces of the wedge blocks C, effecting additional compression of the main spring resistance G. This differential action will occur throughout the period of relative movement of the casings A. The relative approach of the casings A will continue either until the actuating force is reduced or the inner ends of the casings come into engagement, whereupon the casings will limit the compression of the spring resistance G, the actuating force being transmitted directly through the casings to the draft sills, the casings thus acting as a column load sustaining member as hereinbefore pointed out.

When the actuating force is reduced, the expansive action of the spring G will effect release of the wedge friction system comprising the wedge blocks C and the shoes D. It will be evident that due to the initial movement of the casings A without movement of the friction plates, the arms 28 of the spring followers F will be moved away from the lugs 19 of the plates B and the lugs 27 of the friction elements E, thereby facilitating release of the mechanism by permitting outward movement of the friction shoes D and wedge blocks C during initial release without effecting movement of the friction plates B. The arms 28 on the spring followers F, after the initial releasing action just described, will engage the lugs on the friction plates B, carrying the same outwardly and restoring them to the normal position illustrated in Figure 1. Due to the tapered construction of the friction elements E, and the fact that the friction surfaces of the casings A are inclined, the tendency during compression of the mechanism will be to maintain the friction elements E in centered position. However, if these elements should become displaced during compression of the mechanism, restoration of the same to the normal position, which will be substantially that shown in Figure 1, will be assured by the arms 28 engaging the lugs 27 of the friction elements.

While I have herein shown and described what I now consider the preferred manner of carrying out my invention, the same is merely illustrative, and I contemplate all changes and modifications that come within the scope of the claims appended hereto.

I claim:

1. In a friction shock absorbing mechanism, the combination with oppositely arranged hollow front and rear follower casings provided with forwardly and rearwardly converging friction surfaces on the interior thereof, said casings being normally spaced apart and adapted to move relatively to each other; of longitudinally arranged wedge-actuated lateral pressure creating means interposed between said followers at opposite ends of the mechanism, each of said means comprising a wedge block movable with the corresponding follower and a pair of friction shoes co-operating with the wedge block; main spring resistance means interposed between the wedge actuated pressure-creating means; longitudinally arranged friction plates adapted for relative movement upon relative movement of the follower casings, said plates being divided into two groups at opposite sides of the friction shoes; and friction means interposed between each group of plates and the adjacent friction surfaces of said casings.

2. In a friction shock absorbing mechanism, the combination with oppositely arranged hollow front and rear follower casings provided with interior friction surfaces converging toward the opposite ends of the mechanism; of a pair of wedge blocks movable with said casings; front and rear sets of friction shoes co-operating with said wedge blocks; a plurality of relatively movable intercalated friction plates divided into two groups and disposed on opposite sides of the mechanism and co-operating with the friction shoes, said plates being moved inwardly relatively to each other upon relative approach of said casings; an oppositely tapered friction element interposed between each group of plates and the adjacent friction surfaces of said casings; means for effecting restoration of said plates to normal full release position including a main spring resistance opposing movement of said friction shoes.

3. In a friction shock absorbing mechanism, the combination with front and rear follower casings, each provided with oppositely disposed, longitudinally extending friction surfaces, inclined with respect to the longitudinal axis of the mechanism; a plurality of friction plates divided into two groups at opposite sides of the mechanism, said plates being adapted to be moved relatively to each other upon relative movement of said follower casings; front and rear sets of friction shoes co-operating with said groups of plates; front and rear wedge blocks co-operating with the shoes and movable with the front and rear follower casings respectively; spring resistance means opposing relative movement of said front and rear sets of friction shoes; and longitudinally arranged friction elements having inclined friction surfaces co-operating with the friction surfaces of the front and rear follower casings, each of said elements having a friction surface co-operating with one of said groups of friction plates.

4. In a friction shock absorbing mechanism, the combination with a plurality of groups of intercalated friction plates, said plates being adapted for relative movement; of a wedge pressure creating means interposed between said groups of plates, said wedge pressure creating means including front and rear sets of friction shoes co-operating with the friction plates and a wedge block co-operating with each set of friction shoes; front and rear follower casings co-operating with said wedge blocks and adapted to engage to move said friction plates relatively to each other upon relative approach of said follower casings, each of said followers being provided with longitudinally arranged friction surfaces inclined with reference to the axis of the mechanism; a tapered friction element co-operating with each group of plates, each of said friction elements engaging the friction surfaces of both of said follower casings at the corresponding side of the mechanism; and spring resistance means opposing inward movement of said friction shoes, the expansive action of said spring resistance means effecting restoration of the friction plates to normal position when the actuating force is reduced.

5. In a friction shock absorbing mechanism, the combination with a plurality of sets of relatively movable intercalated friction plates divided into two groups; of a front follower casing co-acting with one set of plates of each group to effect movement thereof inwardly of the mechanism, said casing being provided with forwardly converging friction surfaces on the interior thereof; a rear follower casing co-acting with the other set of plates and provided with rearwardly converging friction surfaces on the interior thereof; a friction element interposed between each group of plates and the adjacent friction surfaces of said followers, said element being provided with oppositely extending friction surfaces, one of said surfaces being arranged parallel to and co-operating with one of the friction surfaces of the front follower and the other of said surfaces being arranged parallel to and co-operating with one of the friction surfaces of said rear follower; front and rear pairs of friction shoes co-operating with said groups of plates; a wedge block co-operating with each pair of friction shoes; and spring resistance means interposed between said front and rear pairs of friction shoes, said spring resistance opposing inward movement of the shoes, and the expansive action of said spring resistance effecting restoration of the plates to normal position when the actuating force is reduced.

6. In a friction shock absorbing mechanism, the combination with oppositely arranged front and rear follower casings provided with interior, inclined friction surfaces, said casings being normally spaced apart and adapted to move relatively; of wedge blocks movable with said casings; wedge friction shoes co-operating with the wedge blocks; a spring resistance co-operating with said friction shoes; longitudinally arranged friction plates adapted for relative movement upon relative movement of said follower casings, said plates being divided into two groups on opposite sides of said wedge pressure creating means, each group comprising two sets of plates; means movable with said friction shoes during release of the mechanism to engage each plate near one end thereof for restoring each set of plates to normal position with the last-named ends thereof slightly spaced from the adjacent follower; and a friction element having inclined friction surfaces interposed between each group of plates and the adjacent friction surfaces of said follower casings and having the inclined surfaces thereof co-operating with said inclined friction surfaces of the casings.

7. In a friction shock absorbing mechanism, the combination with opposite arranged front and rear follower casings provided with interior friction surfaces inclined with respect to the axis of the mechanism, said casings being normally spaced apart and adapted to move relatively; of a wedge block movable with each casing; friction shoes co-operating with each wedge block; longitudinally arranged friction plates adapted for relative movement upon relative movement of the follower casings, said plates being divided into two groups and disposed on opposite sides of the friction shoes, each group comprising two sets of plates; a tapered friction element interposed between each group of plates and the adjacent friction surfaces of said casings; a main spring resistance opposing relative approach of said friction shoes; and spring followers interposed between said spring resistance and shoes, said spring followers having means thereon for engaging said plates and restoring the same to normal position after each compression stroke.

8. In a friction shock absorbing mechanism, the combination with a pair of chambered followers, the side walls of each being tapered; of a centrally disposed wedge element carried by each follower; intercalated plates at opposite sides of the mechanism, said plates being relatively movable with reference to each other by engagement with said followers upon relative approach of the latter; friction shoes co-operating with said wedging elements and engaging said plates for creating lateral pressure on said plates during compression of said gear; spring means opposing movement of said friction shoes, said spring means being compressed during relative approach of the followers, and the expansive action of said spring means effecting restoration of the plates to normal position during release of the mechanism; and a tapered plate interposed between the friction plates and the side walls of said chambered followers.

9. In a friction shock absorbing mechanism, the combination with front and rear followers having opposed side walls provided with interior friction surfaces, said opposed interior surfaces converging outwardly of the mechanism; of a plurality of intercalated friction plates, including a plate having surfaces correspondingly inclined to said opposed inclined surfaces of the front and rear followers at one side of the mechanism and engaging the inclined surfaces of said followers at the same side of the mechanism; means for creating lateral pressure on said plates, including front and rear wedge blocks co-operating with said followers and friction shoes interposed between the wedge blocks and plates; and spring resistance means opposing relative movement of the friction shoes, said spring resistance means being compressed during relative approach of the shoes inwardly of the mechanism, the expansive action of said spring resistance during release of the mechanism effecting restoration of the plates to normal position.

In witness that I claim the foregoing I have hereunto subscribed my name this 28th day of January, 1927.

JOHN F. O'CONNOR.